United States Patent
Bean

Patent Number: 5,628,904
Date of Patent: May 13, 1997

[54] **PROCESS FOR TREATMENT OF WASTEWATER UTILIZING ZEBRA MUSSELS (*DREISSENA POLYMORPHA*)**

[76] Inventor: Ronnie A. Bean, 18869 Fabacher Dr., Prairieville, La. 70769

[21] Appl. No.: 574,344

[22] Filed: Dec. 18, 1995

[51] Int. Cl.$^6$ ........................................ C02F 3/32
[52] U.S. Cl. .................. 210/602; 210/150; 210/170; 210/521; 119/234; 119/243
[58] Field of Search ........................ 210/601, 602, 210/767, 150, 170, 521; 119/234, 243

[56] References Cited

U.S. PATENT DOCUMENTS

| | | |
|---|---|---|
| 5,294,351 | 3/1994 | Clum et al. .......................... 210/774 |
| 5,520,810 | 5/1996 | Goudy, Jr. et al. ..................... 210/602 |

*Primary Examiner*—Robert J. Popovics

[57] ABSTRACT

This process involves the flowing of wastewater across a mass of zebra mussels that are attached to a fixed media such as a steel plate. The filtering action of the zebra mussels will remove contaminants. These contaminants will be used as food and incorporated into the mussels body tissue or excreted as feces. Filtered material that is not used as food is encapsulated and excreted as psuedofeces. Periodically the accumulated feces and psuedofeces, along with dead mussels, will have to be removed from the system.

1 Claim, 1 Drawing Sheet

PROCESS FOR TREATMENT OF WASTEWATER UTILIZING ZEBRA MUSSELS (*DREISSENA POLYMORPHA*)

BACKGROUND OF THE INVENTION

This invention relates to the treatment of domestic and industrial wastewaters for the removal or reduction of organic or inorganic contaminants. Wastewater will move over zebra mussels that are attached to a fixed media (plastic, steel, concrete, etc.). The zebra mussels will filter the contaminates from the wastewater and incorporate them into their body mass, excrete them in their feces or encapsulate and excrete them in pseudofeces. The excreted feces and pseudofeces will be collected and periodically removed from the system.

DESCRIPTION OF THE PRIOR ART

There are many patents that deal with the treatment of wastewater. Most domestic sewerage is treated biologically by the use of bacteria. These bacteria can either be in suspension as in an activated sludge type system, or on a fixed media as in a trickling filter, a sand filter, or a rotating biological contactor. Industrial wastewater is often treated biologically or with chemical addition for clarification and stabilization. Few industrial or domestic treatment systems utilize higher plant and animal species to treat wastewater. Water hyacinths and duckweed (lemna sp.) have been used in municipal treatment systems. Rock-reed filters that combine bacterial action on the rock media and higher plants growing in the media have also been used in municipal treatment systems. There are no treatment systems that utilize mollusk to filter out contaminants.

SUMMARY OF THE INVENTION

It is the intent of this invention to provide a biological, low maintenance treatment system that utilizes The filtering action of zebra mussels to remove contaminants. The zebra mussels will filter out organic and inorganic contaminants from the waste stream and either excrete them as feces and psuedofeces, or incorporate the contaminants into their body mass. Wastewater could possibly undergo a pretreatment process prior to the zebra mussel treatment system. The zebra mussels will be attached to a fixed media that will allow the wastewater to flow across the mussels. The excreted feces and pseudofeces will be collected and removed from the treatment system.

BRIEF DESCRIPTION OF THE DRAWINGS

The present invention embodies the concept of flowing wastewater across a fixed media on which is attached zebra mussels, and a collection method for removing the feces and psuedofeces from the system. The concept of the invention will be more fully understood by reference to the following detailed description and drawings of a system that utilizes zebra mussels attached to plates and a collection system for the excreted feces and psuedofeces.

DETAILED DESCRIPTION OF THE DRAWINGS

Figure 1:
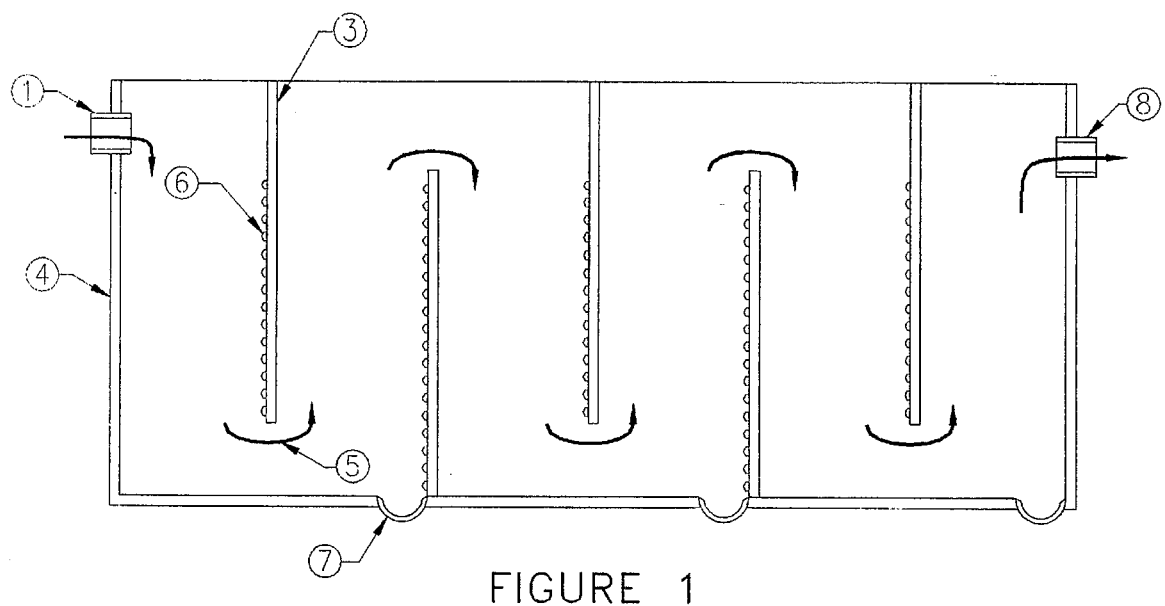
FIG. 1 is a sectional side view of an embodiment of the zebra mussel treatment system.
Figure 2:
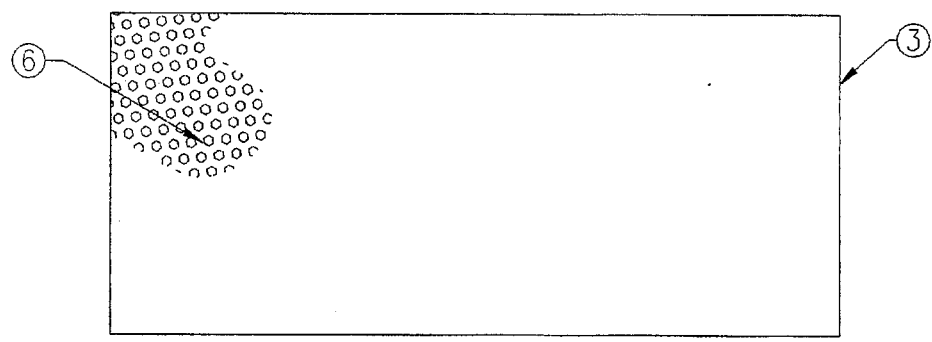
FIG. 2 is a sectional view of a fixed media plate with zebra mussels attached.

This visual conception of a method of utilizing the processes involved in the invention includes a vessel (1) having a wastewater inlet (2) and outlet (7). Fixed plates (3) provide attachment space for zebra mussels (4), and provide baffling that causes the wastewater to flow (5) vertically under one plate (3) and over the next plate. Feces and pseudofeces produced by the zebra mussels (4) attached to the plates (3) fall to the vessel floor (9) and are moved by the wastewater flow (5) to a collection pipe (6) located at the base of the baffle plate (3). After the wastewater flows across multiple plates (3), it exits the vessel through the outlet (7).

I claim:

1. A process for removing organic or inorganic contaminants from a wastewater stream in a wastewater treatment system, the process comprising the steps of:

a) introducing zebra mussels into said wastewater stream and allowing said zebra mussels to attach themselves to a submerged fixed media in said wastewater stream, said submerged fixed media defining a serpentine flowpath;

b) flowing wastewater to be treated past said attached zebra mussels along said serpentine flowpath;

c) allowing said attached zebra mussels to filter out organic and/or inorganic contaminants present in the wastewater stream, and excrete them as feces and psuedofeces; and d) collecting and removing said excretions.

* * * * *